(12) United States Patent
Xiang et al.

(10) Patent No.: US 11,507,411 B1
(45) Date of Patent: Nov. 22, 2022

(54) JITTER-TOLERANT DISTRIBUTED TWO-PHASE COMMIT (2PC) SYSTEMS

(71) Applicant: VMware, Inc., Palo Alto, CA (US)

(72) Inventors: Enning Xiang, San Jose, CA (US); Yiqi Xu, Palo Alto, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 17/382,443

(22) Filed: Jul. 22, 2021

(51) Int. Cl.
*G06F 9/46* (2006.01)
*G06F 11/14* (2006.01)
*H04L 47/283* (2022.01)
*G06F 9/455* (2018.01)

(52) U.S. Cl.
CPC .......... *G06F 9/466* (2013.01); *G06F 11/1471* (2013.01); *H04L 47/283* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2008/0250074 A1* | 10/2008 | Parkinson | G06F 11/1471 |
| 2017/0242726 A1* | 8/2017 | Robinson | G06F 9/466 |
| 2019/0228096 A1* | 7/2019 | Wang | G06F 16/2315 |

OTHER PUBLICATIONS

Attaluri et al. The Presumed—Either Two-Phase Commit Protocol. IEEE Transactions on Knowledge and Data Engineering, vol. 14, No. 5. Published Sep.-Oct. 2002. URL Link: <https://ieeexplore.ieee.org/document/1033784>. Accessed Aug. 2022. (Year: 2002).*

* cited by examiner

*Primary Examiner* — Irene Baker
(74) *Attorney, Agent, or Firm* — Dinsmore & Shohl LLP (57) ABSTRACT

A method of ensuring atomicity of transactions across a plurality of active hosts in a distributed environment, is provided. The method generally includes receiving, from a client, a second request to commit a second transaction subsequent to receiving a first request to commit a first transaction; assigning a second prepare identifier (ID) to the second transaction, wherein the second prepare ID assigned to the second transaction is greater than a first prepare ID assigned to the first transaction; transmitting, to the plurality of active hosts, instructions to prepare for committing the second transaction, the instructions including the second prepare ID; receiving, from each host, an acknowledgement indicating successful preparation for committing the second transaction; and transmitting, to the plurality of active hosts, instructions to commit the second transaction prior to receiving, from each host, an acknowledgement indicating successful preparation for committing the first transaction.

20 Claims, 3 Drawing Sheets

JITTER-TOLERANT DISTRIBUTED TWO-PHASE COMMIT (2PC) SYSTEMS

BACKGROUND

A transaction is a set of operations that form a logical unit of work. The essential idea of a transaction is indivisibility, i.e., either all or none of the operations of the transaction are permanently performed. Traditionally, transaction semantic is defined by ACID properties, namely atomicity, consistency, integrity, and durability.

Unlike a transaction on a local database, a distributed transaction involves altering data on multiple databases. Consequently, distributed transaction processing is more complicated because the database must coordinate the committing or aborting and rolling back of the changes in a transaction. In a distributed environment, a transaction is decomposed into a set of subtransactions, each of which executes at a single participating site, or server. In order to ensure the atomicity property of a distributed transaction, all sites participating in the transaction must coordinate their actions so that they either unanimously abort or unanimously commit the transaction. This is achieved by employing an atomic commit protocol (ACP) that executes a commit or an abort operation across multiple sites as a single logical operation. An ACP ensures that a distributed transaction is either committed and all its effects become persistent across all participating sites, or aborted and all its effects are obliterated as if the transaction had never executed at any site. In other words, the entire transaction commits, or the entire transaction is aborted and rolls back. In database management, saving data changes is known as a commit and undoing changes is known as a roll back.

The most common ACP for ensuring atomicity of multi-site transactions in a distributed environment is the two-phase commit (2PC) protocol. A distributed system that implements the 2PC protocol can include N sites, where N is an integer greater than zero, each of which includes a representation of the same data. For example, each site may be represented as a host, where each host has access to a separate data store that includes a representation of the same data. Data accessible by each host is updated such that data remains consistent, regardless of any host or network failures in the distributed system. To achieve this result, the 2PC protocol implements a 2PC coordinator (also referred to herein as a master site or 2PC engine) which is a separate entity connected to each of N hosts.

As the name implies, 2PC consists of two phases, namely a voting phase and a decision phase. During the voting phase, or prepare phase, the 2PC coordinator requests all hosts participating in the transaction's execution to prepare-to-commit whereas, during the decision phase, or commit phase, the 2PC coordinator either decides to commit the transaction if all the participating sites (e.g., hosts) are prepared to commit (e.g., voted "yes" or agreed to the transaction), or to abort if any participant has decided to abort (e.g., voted "no" or not agreed to the transaction).

Where all hosts involved in the transaction are prepared to commit (e.g., voted "yes" or agreed to the transaction), then the 2PC coordinator initiates the "commit" phase of the 2PC protocol. During the commit phase, the 2PC coordinator transmits a commit message to each host requesting the host to modify the data according to the transaction. According to the 2PC protocol, once the host receives the commit message, the host is required to perform the transaction, thereby guaranteeing the transaction. On the other hand, where at least one host involved in the transaction has decided to abort (e.g., voted "no" or does not agree to the transaction), then the 2PC coordinator transmits a message to each host that voted "yes" to the transaction, instructing the host to discard whatever temporary information the host has stored during the "prepare" phase.

Although the 2PC protocol may ensure that all participants in a distributed transaction reach consistent states, jitter associated with conventional distributed 2PC systems may adversely impact write input/output (I/O) performance of the system. Jitter is the variation in latency (or delay) during transmission or processing of a signal or packet. Jitter may occur where a signal or packet gets queued or delayed somewhere in transmission from one entity to another, while other signals or packets are not subject to delay. Jitter may result due to variations in I/O write paths at different hosts, network congestion, timing drift, poor hardware performance, and/or congestion at the disk layer.

In the context of distributed 2PC systems, prepare messages generated and transmitted by the 2PC coordinator likely encounter jitter, including both network jitter and disk jitter. For example, a network connection between the 2PC coordinator and one host may have greater latency than a network connection between the 2PC coordinator and another host due to congestion and/or quality of the network connection. This differentiation in latency may cause some prepare messages to arrive at one host earlier than another host also receiving the prepare message. Latency variation may also be apparent in preparation of the write request and return acknowledgement of the prepare message, thereby causing further delay in acknowledging the prepare message.

In other scenarios, jitter during preparation of the client write may be increased due to a cache miss. Specifically, in some cases where deduplication techniques (e.g., data deduplication is a technique for eliminating duplicated or redundant data) are implemented, a caching policy may be introduced such that prior to preparing a write request, each host may determine whether the received write request corresponds to a unique write I/O for the given payload data by checking a cache. The cache may be stored in physical memory (e.g., random access memory (RAM)) configured within a host and act as a small, fast memory that can be used to determine whether the write request is for duplicated payload data already stored at the host by locating a hash corresponding to the payload data in the cache, without needing to access storage. A cache miss may occur when a request to retrieve a hash corresponding to the payload data is not currently in the cache memory. Where this occurs, acknowledgement of the prepare message may be even further delayed (e.g., in addition to the delay already encountered during transmission of the prepare message and/or delay caused by hardware performance problems at the host). In addition, other failures can occur, such as application failure or system failure, while waiting for a client write request to prepare or commit.

Such jitter issues and failures may cause latency amplification in conventional implementations of the distributed 2PC protocol. For example, a delay caused by jitter or failure may cause multiple hosts to receive and process a write I/O at a slower rate. Because write requests are committed sequentially and write requests require all hosts involved in the transaction to agree to the transaction before being committed, delay in receipt and processing of a prepare message may exponentially increase latency on the distributed 2PC system.

In turn, the system may become overloaded with prepared write requests waiting to be committed, thereby negatively affecting overall write I/O performance of the system. In cases where a client write request incurs substantial latency due to jitter or failure, client write requests accumulate and, when the number of accumulated inflight prepare requests reaches a configured threshold, the 2PC system may halt operation and stop working. This may especially occur in systems having a high write I/O workload. Hence, overall write I/O performance using the 2PC protocol may be compromised.

Accordingly, solutions for addressing the latency amplification problem in the distributed 2PC protocol are desired.

It should be noted that the information included in the Background section herein is simply meant to provide a reference for the discussion of certain embodiments in the Detailed Description None of the information included in this Background should be considered as an admission of prior art.

DETAILED DESCRIPTION

Aspects of the present disclosure introduce a jitter-tolerant distributed two-phase commit (2PC) solution to address latency issues associated with conventional distributed 2PC systems. As discussed above, a 2PC protocol breaks a database commit into two phases to ensure correctness and fault tolerance, across distributed transactions, in the distributed database system.

Each client write request received by the distributed 2PC system may be assigned a monotonically increasing log sequence number (LSN). An LSN represents the offset, in bytes, of a log record from the beginning of a database log file. In other words, an LSN corresponds to a given position in a log file and is monotonically increased for each incoming write received by the distributed 2PC system.

LSNs assigned to each incoming write request may have a sequential order property requiring write requests associated with lower LSNs to be committed prior to committing write requests associated with higher LSNs in conventional 2PC systems. In conventional 2PC systems, in the prepare phase, write requests associated with different LSNs can be prepared in parallel regardless of the LSN associated with the write request; however, during the commit phase, the write requests are committed sequentially. Thus, where at least one write request associated with a lower LSN experiences high latency, e.g., caused by jitter or failure as discussed above, the write requests associated with higher LSN values will be blocked. In some cases, especially in systems having a high write input/output (I/O) workload, the number of inflight write requests (e.g., write requests that have been successfully prepared and acknowledged) may exceed a configured threshold of the 2PC system, thereby causing the system to halt operation when a write request with a lower LSN is blocking many write requests with higher LSNs from being committed. Therefore, overall performance of the system may be compromised.

Accordingly, certain aspects of the present disclosure introduce a jitter-tolerant solution for distributed 2PC systems. In some embodiments, a monotonically increasing unique commit LSN is not assigned to a received client write I/O request until the commit phase. In some embodiments, in the prepare phase, a monotonically increasing unique prepare identifier (ID) is generated and assigned to each received client write I/O request. The prepare ID may be assigned to each client write I/O request at the prepare phase, as opposed to assigning the LSN to each client write I/O request at the prepare phase. The prepare ID does not have a sequential order property and, therefore, client write I/O requests prepared with a larger prepare ID may be committed without waiting for updates with lower prepare IDs to be successfully prepared and acknowledged. In this way, when a particular client write I/O request encounters large I/O latency during the prepare phase of the 2PC protocol, the other client write I/O requests received by the distributed 2PC system will not be delayed and, instead, can be committed without waiting for the successful preparation and acknowledgement of the delayed write request I/O, even when the delayed write request I/O is associated with smaller prepare ID values. This reduces latency for the other write request I/Os and helps prevent the number of inflight write requests from exceeding the threshold. Accordingly, the 2PC workflow may not be blocked by any jitter encountered during the prepare phase thereby improving performance of the distributed 2PC system.

Figure 1:
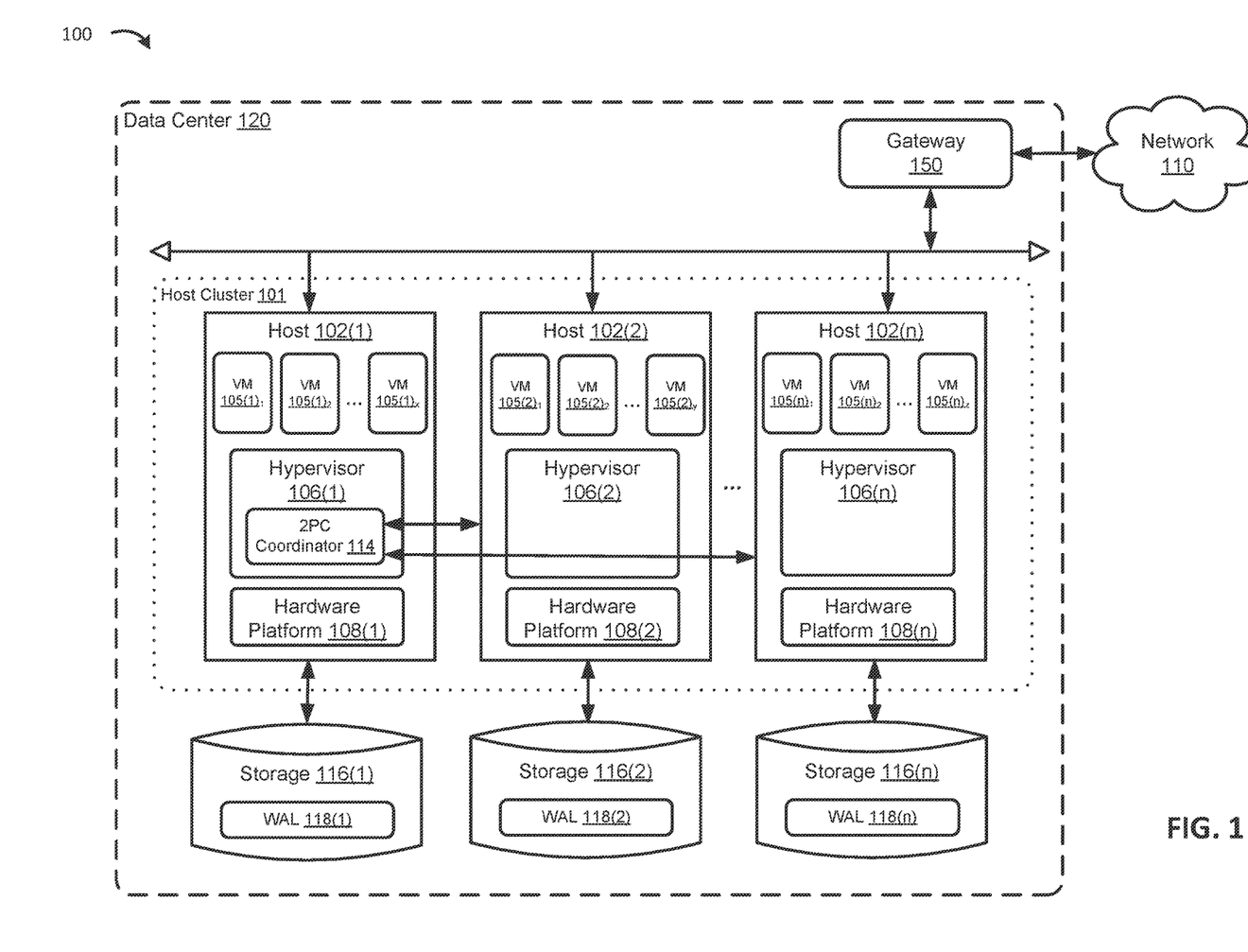
FIG. 1 depicts example physical and virtual network components of a networking environment with which embodiments of the present disclosure may be implemented.

FIG. 1 depicts example physical and virtual network components of a networking environment 100 with which embodiments of the present disclosure may be implemented.

The networking environment 100 includes a data center 120 connected to a network 110. The network 110 is generally representative of a network of computing entities, such as a local area network ("LAN") or a wide area network ("WAN"), a network of networks, such as the Internet, or any connection over which data may be transmitted between connected computing entities. For example, data can be transmitted in and out of data center 120 via network 110.

Data center 120 generally represents a set of networked computing entities, and may comprise a logical overlay network. As shown, data center 120 includes a host cluster 101, storage 116, and a gateway 150. Gateway 150 provides components in data center 120 with connectivity to network 110, and is used to communicate with destinations external to data center 120. Gateway 150 may be a virtual computing instance (VCI), a physical device, or a software module running within a host 102.

Host cluster 101 includes hosts 102(1) . . . (n) (collectively referred to as hosts 102). Each of hosts 102 may be constructed on a server grade hardware platform, such as hardware platforms 108(1) . . . (n) (collectively referred to as hardware platforms 108). An example of a hardware platform is an x86 architecture platform. Hosts 102 may be geographically co-located servers on the same rack or on different racks. Each host 102 is configured to provide a virtualization layer, also referred to as a hypervisor 106(1) . . . (n) (collectively referred to as hypervisors 106). Hypervisors 106 abstract processor, memory, storage, and networking physical resources of hardware platforms 108 into a number of VCIs or virtual machines (VMs) $105(1)_1$-$105(1)_x$, $105(2)_1$-$105(2)_y$, $105(n)_1$-$105(n)_z$ (collectively referred to as VMs 105) on hosts 102. As shown, multiple VMs 105 may run concurrently on the same host 102.

Each of hypervisors 106 may run in conjunction with an operating system (OS) (not shown) in its respective host 102. In some embodiments, hypervisors 106 can be installed as system level software directly on hardware platforms 108 of its respective host 102 (e.g., referred to as "bare metal" installation) and be conceptually interposed between the physical hardware and the guest OSs executing in the VMs 105. Though certain aspects are described herein with respect to VMs running on host machines, it should be understood that such aspects are similarly applicable to physical machines, like host machines 102, without the use of virtualization.

In certain embodiments, a 2PC protocol is implemented in networking environment 100 to provide a distributed 2PC system. Accordingly, one of hosts 102 is designated as a 2PC coordinator (also referred to as a master site) while remaining active hosts 102 in networking environment 100 are designated as the participants (also referred to as components). As shown in FIG. 1, host 102(1) is designated as 2PC coordinator and, thus hypervisor 106(1) implements a 2PC engine (referred to herein as 2PC coordinator 114). It should be noted that the 2PC coordinator 114 may instead be implemented on host 102 directly, run on an OS running on host 102, etc. 2PC coordinator 114 is configured to coordinate all activities and synchronizations between active participants in the distributed 2PC system.

Remaining hosts 102(2) . . . (n) that are active (e.g., connected and operative) in networking environment 100 represent participants in the 2PC protocol. Each host 102 of hosts 102(2) . . . (n) has access to a separate storage 116(2) . . . (n) (collectively referred to as storage 116), respectively, that includes a representation of the same data.

Storage 116 provides VMs 105 and/or physical machines 102 access to consolidated, block-level data storage. As shown in one embodiment, each storage 116 is storage directly coupled to a host 102. In another embodiment, storage 116 are collectively a virtual storage area network (vSAN) that aggregates local or direct-attached capacity devices of host cluster 101 and creates a single storage pool shared across all hosts 102 in host cluster 101. In another embodiment, storage 116 includes local storage in hardware platform 108 of each host 102.

Storage 116 manages storage of data at a block granularity. For example, storage 116 is divided into a number of physical blocks (e.g., 4096 bytes or "4K" size blocks), each physical block having a corresponding physical block address (PBA) that indexes the physical block in storage. The physical blocks of storage 116 are used to store blocks of data (also referred to as data blocks) used by VMs 105 and/or physical machines 102, which may be referenced by logical block addresses (LBAs). Blocks of data may be stored as compressed data or uncompressed data in storage 116, such that there may or may not be a one to one correspondence between a physical block on storage 116 and a data block referenced by an LBA. Storage 116 receives 110 requests for a data block from a VM 105 and/or physical machine 102, which VM 105 and/or physical machine 102 refers to using an LBA that is in an address space used by the VM and/or physical machines to address blocks of data. Such an LBA may be referred to as an LBA of the data block.

In one embodiment, storage 116 is a write-ahead-log (WAL)-based storage system including a WAL 118 (e.g., WAL 118(2) . . . (n), collectively referred to as WAL 118). In particular, WAL 118 provides atomicity and durability guarantees in storage 116 by persisting every change as a command to an append-only log before they are written to storage 116. For example, client requests to write data to storage 116 may be processed by recording the received client write request in WAL 118 (e.g., as a log record). As described in more detail below, WAL 118 may be a prepare log, and in some cases, converted to a commit log after both receiving a command from 2PC coordinator 114 including instructions to commit data and committing the data in data store 116, in accordance with the command.

The 2PC protocol implemented in networking environment 100 breaks a database commit into two phases to ensure correctness and fault tolerance, across hosts 102, in the distributed database system. As mentioned previously, the two phases may include a "prepare" phase, also referred to as a voting phase, and a "commit" phase, also referred to as a decision phase.

Conventional distributed 2PC implementations assign an LSN to each write request received by 2PC coordinator 114 when the write request is received. Accordingly, during the prepare phase of the conventional 2PC protocol, 2PC coordinator 114 transmits a prepare message to each host 102 that includes the LSN and the details of the transaction related to the LSN. The LSNs are assigned in a sequential fashion. In particular, a second incoming write request received by 2PC coordinator 114 is assigned an LSN greater than a first incoming write request received by 2PC coordinator 114 at an earlier time.

In the conventional distributed 2PC implementations, each host 102, after receiving the prepare message, persists payload data associated with the received LSN to its respective storage 116. In an illustrative example of the conventional distributed 2PC implementation, 2PC coordinator 114 receives three client write I/O requests over a period of time, the first received client write I/O request is assigned LSN1, the second received client write I/O request is assigned LSN2, and the third received client write I/O request is assigned LSN3 by 2PC coordinator 114. Each host 102 generates a prepare log record in WAL 118 for storing metadata associated with the payload data, wherein the metadata includes at least the LSN. Each host 102 may receive multiple prepare messages, each related to different LSNs or client writes; however, preparation of each write request to relevant disk components of each host 102 (e.g., persisting the payload data and generating a record in the prepare log) may be independent of the LSN associated with each write. In other words, a write request assigned a larger LSN may be prepared by host 102 prior to a write request assigned a lower LSN. Following preparation of each write request, each host 102 sends an acknowledgement message to 2PC coordinator 114.

In the conventional distributed 2PC implementations, although a client write may be prepared irrespective of its assigned LSN, a prepared client write with a higher LSN may not be committed until client write I/O requests associated with lower LSNs have been committed (and also, therefore, prepared) by all hosts 102 receiving the prepare message. Thus, in the illustrative example, the write request associated with LSN3 is not committed at each host 102 until the write request associated with LSN1 and the write request associated with LSN2 have been committed (and prepared and acknowledged) by all hosts, and similarly, the write request associated with LSN2 is not be committed at each host 102 until the write request associated with LSN1 has been committed by all hosts. In other words, 2PC coordinator 114 may not initiate the commit phase for the write request associated with LSN3 until 2PC coordinator 114 receives acknowledgment of preparation of the write request associated with LSN1 and the write request associated with LSN2 at each host 102, and 2PC coordination 114 may not initiate the commit phase for the write request associated with LSN2 until 2PC coordinator 114 receives acknowledgement of preparation of the write request associated with LSN1 at each host 102. Unfortunately, as discussed above, this may cause blockage of prepared write requests due to jitter and/or failure. For example, if a host 102 does not prepare and send a successful acknowledgement for the write request associated with LSN1, due to jitter, then the write requests having LSNs behind the unprepared write request, such as the write requests associated with LSN2 and LSN3 are blocked, which ties up resources at 2PC coordinator 114 until all write requests with lower LSNs (e.g., LSN1) have been prepared and acknowledged.

Figure 2:
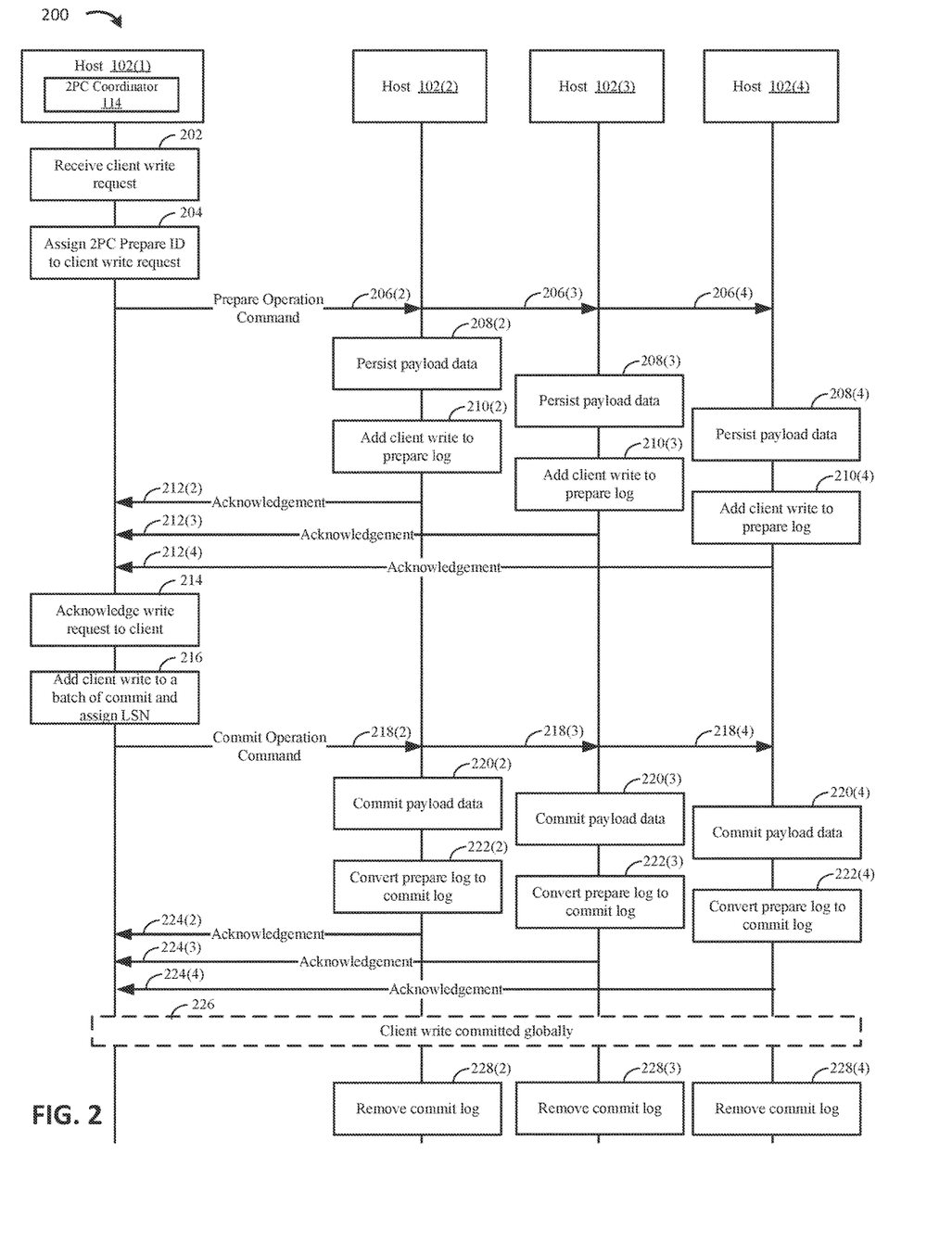
FIG. 2 is a call flow diagram illustrating example operations for a jitter-tolerant two-phase commit (2PC) protocol in distributed 2PC systems, according to an example embodiment of the present application.

Accordingly, aspects of the present disclosure introduce a jitter-tolerant solution for distributed 2PC systems in which a prepare ID is assigned in the prepare phase and the LSN is not assigned until the commit phase. FIG. 2 is a call flow diagram illustrating example operations 200 for a jitter-tolerant 2PC protocol in distributed 2PC systems, according to an example embodiment of the present application. As illustrated in FIG. 2, four hosts, host 102(1)-102(4) may be active within the distributed 2PC system, and host 102(1) may be designated as 2PC coordinator 114. Although the embodiment illustrated in FIG. 2 illustrates host 102(1) designated as 2PC coordinator 114, any of active hosts 102(2)-102(4) may be designed as 2PC coordinator 114 in other embodiments. Further, although the embodiment illustrated in FIG. 2 includes only four active hosts, any number of active hosts may be considered in other embodiments. Operations 202 through 212 of FIG. 2 may relate to the prepare phase of the 2PC protocol, while operations 214 through 228 may relate to the commit phase of the 2PC protocol.

Beginning at operation 202, 2PC coordinator 114 receives a client write I/O request. For example, the client write I/O request requests to write data for an LBA, e.g., LBA3, in storage 116.

In response to receiving the client write request I/O, at operation 204, 2PC coordinator 114 assigns a monotonically increasing prepare ID to the client write request I/O to write data for LBA3. For example, where previously 2PC coordinator received two client write I/O requests requesting to write data for LBA1 and LBA2 and assigned a first prepare ID, Prepare ID1, to the client write I/O request associated with LBA1 and assigned a second prepare ID, Prepare ID2, to the client write I/O request associated with LBA2, then at block 204, 2PC coordinator 114 may assign a third prepare ID, Prepare ID3, to this incoming write I/O request associated with LBA3 received at operation 202. This is unlike conventional distributed 2PC implementations where an LSN, as opposed to a prepare ID, is assigned to each client write I/O request received by 2PC coordinator 114. As mentioned previously, where as an LSN has a sequential order property, a prepare ID does not have sequential order property. In other words, a client write I/O request assigned a prepare ID may be prepared and committed irrespective of its prepare ID value or the prepare ID value of other client write I/O requests.

At operation 206, 2PC coordinator 114 transmits a prepare message (e.g., a prepare operation command) to each host 102 including instructions instructing each host 102 to prepare the client write I/O request to write data for LBA3. The prepare message may include Prepare ID 3 and details of the transaction related to the Prepare ID, including payload data for LBA3 to be written to storage 116.

At operation 208, each host 102 persists the payload data for LBA3 to their respective storage 116, and at operation 210, adds the client write I/O request for LBA3 to their respective WAL 118. In particular, each host 102 adds a record to their respective WAL 118, the record including metadata associated with the client write I/O request for LBA3. Recorded metadata may include one or more of the LBA associated with the client write request, a number of uncompressed contiguous blocks for which payload data associated with the LBA is stored within (also referred to herein as "numBocks"), the assigned Prepare ID, etc. Accordingly, in FIG. 2, hosts 102(2)-(4) create a record in WALs 118(2)-(4), respectively, which includes at least LBA3 and Prepare ID3.

At operation 212, after successfully preparing the client write for LBA3 at operation 208 and operation 210, each host 102 transmits an acknowledgement message back to 2PC coordinator 114. The acknowledgement message received from each host 102 indicates to 2PC coordinator 114 that the client write I/O request for LBA3 has been successfully prepared at that host 102.

While the embodiment of FIG. 2 illustrates reception of the prepare message from 2PC coordinator 114 at each host 102 at the same time, as mentioned above, this may not be the case in some embodiments, and especially in embodiments involving a distributed 2PC system with increased jitter. As mentioned, jitter in the distributed 2PC system may cause the prepare message received at host 102(2) to be received at a different time than the prepare message received at host 102(3) and also, in some cases, at a different time than the prepare message received at host 102(4). Accordingly, hosts 102 may begin to persist the payload data at operation 208 at different times, at least due to different reception times of the prepare message from 2PC coordinator 114. For example, the prepare message intended for host 102(4) may be delayed such that it is not received by host 102(4) until after host 102(2) and/or host 102(3) has already begun persisting payload data associated with LBA3 at 208, adding the client write I/O request to WAL 118 at operation 210, and/or transmitting an acknowledgement message to 2PC coordinator at operation 212.

In addition to jitter in transmission, jitter at operation 208 and operation 210 (e.g., during preparation) may also cause transmission of the acknowledgement message at operation 212 to be delayed at some hosts 102 compared to others. In particular, latency caused by, for example, disk jitter, a cache miss, or poor hardware at each host 102 as described previously, may contribute to the variation in preparation of the write at different hosts 102. This variation for the preparation of the client write I/O request for LBA3 is illustrated in FIG. 2 by the staggering pattern of operation 208 and operation 210 at each host 102.

While timing variation in transmitting the acknowledgement message to 2PC coordinator 114 at operation 212 may be due to latency associated with the reception and preparation of the client write request I/O for LBA3, in some cases, the variation may be due to latency associated with the reception and preparation of other client write request I/Os. For example, client write I/O requests requesting to write data for LBA1 and LBA2 were received prior to the client write I/O request requesting to write data for LBA3, thus it is possible that latency in the reception and preparation of write requests for LBA1 and LBA2 may also further delay the preparation and acknowledgment of successful preparation at one host 102 compared to another host 102. However, it is to be noted that each host 102 may prepare each write request irrespective of its prepare ID. Accordingly, in some cases, the preparation of the write request associated with Prepare ID3 associated with LBA3 may be prepared prior to the write request associated with Prepare ID1 associated with LBA1 and/or the write request associated with Prepare ID2 associated with LBA2, thus the preparation and acknowledgment of successful preparation of the client write I/O request for LBA3 may not be delayed by these writes corresponding to earlier Prepare IDs.

Further, FIG. 2 illustrates all active hosts 102 agreeing to perform the transaction, or in other words, voting "yes" in response to the prepare message transmitted by 2PC coordinator 114 at operation 206. However, in some implementations, one or more hosts 102 may not agree to perform the transaction, or in other words, vote "no" in response to the prepare message transmitted by 2PC coordinator 114. In such a case, 2PC coordinator 114 initiates an abort phase of the 2PC protocol. Accordingly, remaining operations 214 through 228 of FIG. 2 may not be performed, and instead 2PC coordinator 114 transmits a message to each host 102 that voted "yes" to the transaction instructing each host 102 that voted "yes" to discard whatever temporary information each host 102 had stored during the prepare phase. For purposes of this illustration however, it is assumed that all active hosts 102 agree to perform the transaction, thus the process illustrated in FIG. 2 may continue beyond operation 212.

At operation 214, after receiving an acknowledgement message from each host 102 indicating successful preparation of the client write I/O request assigned Prepare ID3 at each host 102, 2PC coordinator 114 acknowledges the client requesting data to be written for LBA3.

At operation 216, 2PC coordinator 114 adds the client write I/O request assigned Prepare ID3 to a commit batch. The commit batch includes one or multiple writes prepared and acknowledged by each active host 102. For example, the commit batch includes the client write I/O request assigned to Prepare ID3, the client write I/O request assigned Prepare ID2, and the client write request I/O assigned Prepare ID1.

Further at operation 216, each client write I/O request added to the commit batch, and the commit batch is assigned a monotonically increased unique LSN. An LSN may be assigned to each client write I/O request irrespective of its Prepare ID value. For example, for a batch commit including the client write I/O request assigned Prepare ID3 and the client write I/O request assigned Prepare ID2, but not the client write I/O request assigned Prepare ID1, 2PC coordinator 114 may assign a lower value LSN, e.g., LSN1, to the batch containing the client write I/O requests assigned Prepare ID3 and Prepare ID2 than an LSN assigned to a batch with the client write I/O request assigned Prepare ID1, e.g., LSN 2. The assigned LSN may indicate to each host 102 the order in which the client write I/O requests in the commit batch are to be committed by each host 102 as compared to another batch of commit (e.g., a commit message for a commit batch assigned LSN2 may not be sent by 2PC coordinator to each host 102 and each host may not commit writes in the commit batch assigned LSN2 until writes in a commit batch assigned LSN1 are globally committed). Waiting to assign an LSN to each client write I/O request until after the client write I/O request has been successfully prepared at each active host 102 helps to ensure that no client write I/O requests are blocked by earlier received client write I/O requests that may have incurred excessive latency during the prepare phase (e.g., due to jitter in the distributed 2PC system).

Accordingly, at operation 218, 2PC coordinator 114 transmits a commit message (e.g., a commit operation command) to each host 102 instructing each host 102 to commit the client write I/O requests for the commit batch associated with the assigned LSN, e.g., LSN1 for the commit batch with the write request assigned Prepare ID3 and the write request assigned Prepare ID2. The commit message may include the Prepare IDs and the LSN assigned to the commit batch.

At operation 220, each host 102 commits the previously persisted payload data for LBA3 to their respective storage 116, and at operation 222, adds the LSN to the original record created for the client write I/O request in WAL 118 at operation 210. In other words, each host 102 converts the prepare log associated with LBA3 and Prepare ID3 to a commit log by adding the assigned LSN to the log record. Thus, after operation 222, a commit log, but no prepare log, for LBA3 and Prepare ID3 may exist at each host 102.

At operation 224, after successfully committing the payload data for LBA3 to storage 116 and converting the prepare log to a commit log at operation 220 and operation 222, respectively, each host 102 transmits an acknowledgement message back to 2PC coordinator 114. The acknowledgement message received from each host 102 indicates to 2PC coordinator 114 that the client write I/O request for LBA3 has been successfully committed at that host 102.

Similar to operations 206-212 of the prepare phase of the 2PC protocol, operations 218-224 of the commit phase of the 2PC protocol may also not all occur or complete at the same time at each host 102, at least in part due to jitter in the distributed 2PC system. For example, although FIG. 2 illustrates reception of the commit message at operation 218 by each host 102 at the same time, jitter may cause the commit message to be received at host 102(2) to be received at a different time than the commit message received at host 102(3) and also, in some cases, at a different time than the commit message received at host 102(4).

At operation 226, after receiving an acknowledgement message from each host 102 indicating successful commitment of the client write I/O request assigned Prepare ID3 in storage 116 at each host 102, 2PC coordinator 114 determines the client write I/O request assigned Prepare ID3 has been globally committed (e.g., committed on all active hosts 102) and marks it as such.

At operation 228, once the client write I/O request has been globally committed, each host 102 may remove the commit log record corresponding to Prepare ID3 and its assigned LSN. Although FIG. 2 illustrates each host 102 removing the commit log record corresponding to Prepare ID3 and its assigned LSN at the same time, removal of the commit log record may be independent of removal at other hosts 102. In other words, host 102(2) may remove its commit log record at a time independent of when host 102(3) removes its commit log record, and in some cases, further at a time independent of when host 102(4) removes its commit log record. In some cases, a host 102 may determine the client write I/O request associated with Prepare ID3 and its assigned LSN has been globally committed when receiving a new commit message for another batch of client write I/O requests to commit, and thus at this time, determine to remove any commit log records for client write I/O requests that are determined to be globally committed.

In some cases, a failure may occur prior to completion of the jitter-tolerant 2PC protocol described with respect to FIG. 2. In some examples, the failure may constitute an application failure. For example, an application failure may include the failure of a host 102 to process a prepare message (such as the prepare message received at operation 206 in FIG. 2) (e.g., a no-memory transient error). Accordingly, a host 102 which has failed to process the prepare message may return a corresponding failure code in its acknowledgement message (such as the acknowledgement message transmitted to 2PC coordinator 114 at operation 212 or operation 224 in FIG. 2) such that 2PC coordinator 114 is aware of the failure. In some other examples, the failure may constitute a system failure. For example, a system failure may include the failure of an originally-active host 102 in the distributed 2PC system. Accordingly, 2PC coordinator 114 may learn of this failure from another system that monitors the status of hosts 102 in the distributed 2PC system (e.g., via a notification from the other system). To ensure consensus when such a failure occurs during the 2PC protocol, 2PC coordinator 114 may be configured to request prepare logs and commit logs from all hosts 102 in the distributed 2PC system, and based at least in part on the type and number of received logs, determine appropriate action with respect to one or more client write I/O requests that were in the process of being prepared or committed when the failure occurred. Appropriate action may include determining to abort one or more transactions, determining to re-commit one or more transactions with prior assigned LSN(s), determining to re-commit one or more transactions with newly assigned LSN(s), or determining to take no further action with respect to one or more transactions (e.g., neither commit nor abort the one or more transactions).

Figure 3:
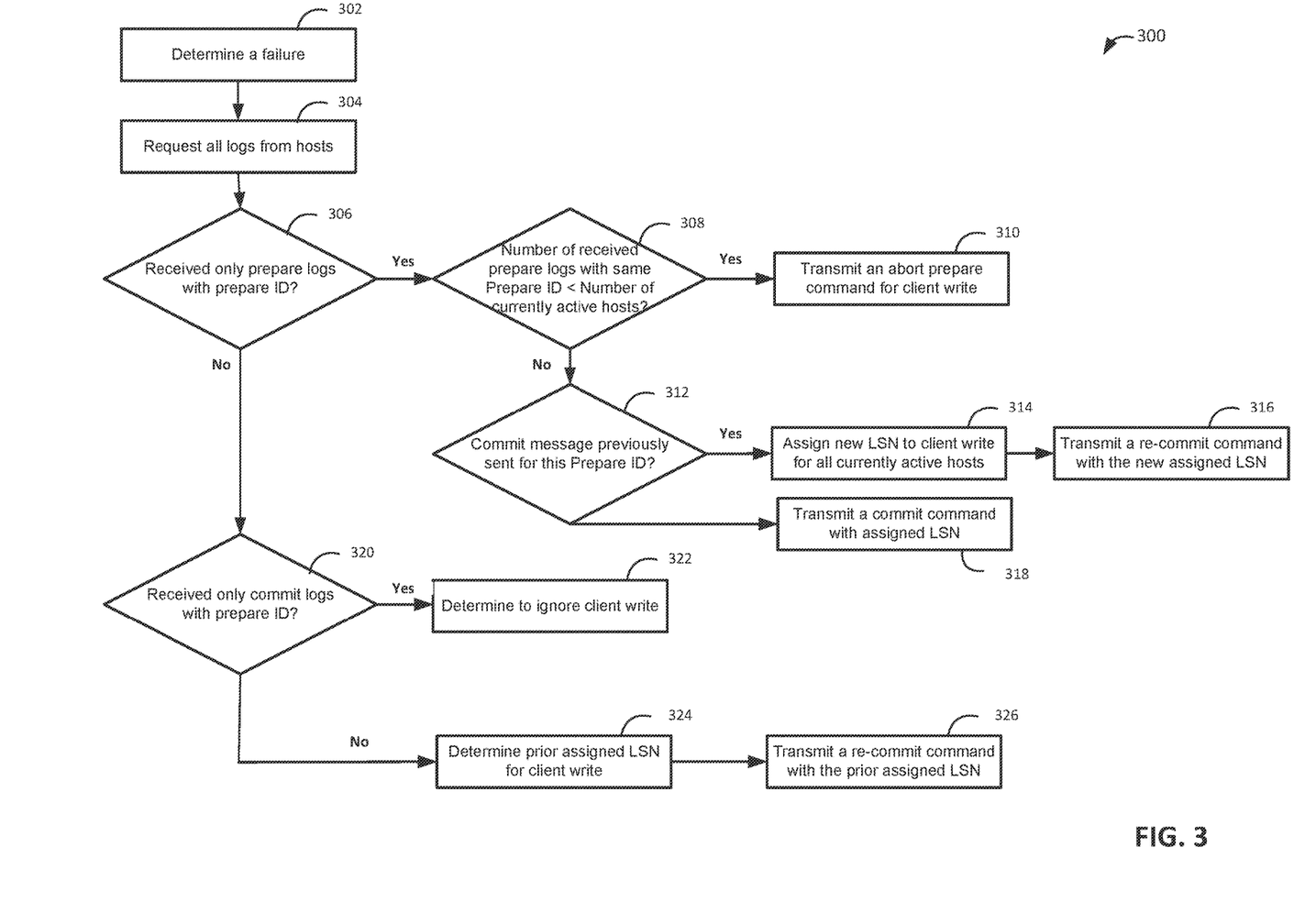
FIG. 3 is an example workflow for failure recovery for a jitter-tolerant 2PC protocol in distributed 2PC systems, according to an example embodiment of the present application.

FIG. 3 is an example workflow 300 for failure recovery for a jitter-tolerant 2PC protocol in distributed 2PC systems, according to an example embodiment of the present application. Workflow 300 may be used to determine appropriate action for one or more client write I/O requests not yet committed in storage 116 at each host 102 when failure occurs in the distributed 2PC system. Workflow 300 of FIG. 3 may be performed, for example, by 2PC coordinator 114.

Workflow 300 may begin, at operation 302, by 2PC coordinator 114 determining a failure. The failure, as described herein, may be an application failure or a system failure. In response to determining the failure at operation 302, at operation 304, 2PC coordinator 114 requests all logs from active hosts 102. It may be noted that after determination of a failure, a number of currently active hosts 102 may be less than a number of hosts 102 active at the time of receipt of a prepare message (referred to herein as initially active hosts 102) for one or more client write I/O requests not yet committed in storage 116 at each host 102 involved in the distributed transaction when the failure occurred. At operation 306, 2PC coordinator 114 determines whether logs requested from currently active hosts 102 include only prepare logs, e.g., log records recorded in WAL 118 with corresponding Prepare IDs, and no corresponding LSNs.

In an example failure recovery scenario, where 2PC coordinator 114 receives only prepare logs from currently active hosts 102, at operation 308, 2PC coordinator 114 determines whether a number of received prepare logs corresponding to a same prepare ID is less than a number of currently active hosts 102. For example, assuming there are currently three active hosts 102, 2PC coordinator 114 may determine whether three prepare logs with Prepare ID1 are received or less than three prepare logs with Prepare ID1 are received to ascertain whether the failure occurred before all currently active hosts 102 were able to prepare the client write I/O request for Prepare ID1.

Where 2PC coordinator 114 determines the number of received prepare logs corresponding to a same prepare ID is less than a number of currently active hosts 102 when a prepare message for the Prepare ID in question was sent, then 2PC coordinator 114 may conclude that the failure occurred before all currently active hosts 102 were able to prepare the client write I/O request for a same Prepare ID. Accordingly, at operation 310, 2PC coordinator 114 may abort the transaction by transmitting an abort command for this Prepare ID to all currently active hosts 102. The abort command may include instructions instructing each of the currently active hosts 102 to abort the prepare for the client write I/O request indicated by the Prepare ID.

In another failure recovery scenario, where 2PC coordinator 114 determines the number of received prepare logs corresponding to a same Prepare ID is not less than a number of currently active hosts 102, then at operation 312, 2PC coordinator 114 may determine whether a commit message was previously transmitted for this Prepare ID. Where 2PC coordinator 114 determines a commit message was prior transmitted at operation 312, 2PC coordinator 114 may conclude that the failure occurred after all active hosts 102 were able to prepare the client write I/O request for the same Prepare ID. Thus, 2PC coordinator 114 may determine that the failure is associated with disconnection of an initially active host 102 (e.g., a number of currently active hosts 102 is less than a number of initially active hosts 102). In particular, given currently active hosts 102 are all able to provide a prepare log for the same Prepare ID, but are not able to provide any commit logs, and a commit message was transmitted to hosts 102 for the Prepare ID, 2PC coordinator 114 is able to ascertain that an initially active host 102 has become disconnected prior to commitment of the write.

Accordingly, at operation 314, 2PC coordinator 114 may assign a new LSN to the client write I/O request and, at operation 316, transmit a re-commit command for this client write I/O request corresponding to the newly assigned LSN. The command may instruct all currently active hosts 102 to re-commit using the newly assigned LSN. 2PC coordinator 114 may assign a new LSN in case the disconnected host(s) 102 are reconnected. In particular, the disconnected host(s) 102 may possess the originally assigned LSN, but not the newly assigned LSN, thus, when the disconnected host(s) 102 reconnect they may resync the client write I/O request, for the LSN the disconnected host(s) 102 possesses does not match the newly assigned LSN.

Referring back to operation 312, where 2PC coordinator 114 determines a commit message was not previously transmitted for this Prepare ID, 2PC coordinator 114 may conclude that the prepare of the write for this Prepare ID was successful on all hosts 102, but no commit message had been transmitted prior to the failure occurring. Accordingly, 2PC coordinator 114 may resume the 2PC procedure for committing of the client write I/O request corresponding to this Prepare ID and add the client write I/O request to a commit batch, assign a monotonically increasing LSN to the commit batch, and transmit a commit message (e.g., a commit operation command) to each host 102 instructing each host 102 to commit the client write I/O requests for the commit batch associated with the assigned LSN.

In yet another failure recovery scenario, returning back to operation 306, where 2PC coordinator 114 does not receive only prepare logs from currently active hosts 102, at operation 320, 2PC coordinator 114 determines whether logs requested from currently active hosts 102 include only commit logs, e.g., log records recorded in WAL 118 with Prepare IDs and corresponding LSNs. Where 2PC coordinator 114 receives only commit logs from currently active hosts 102, at operation 322, 2PC coordinator 114 may determine no further action is necessary, e.g., neither a commit command nor an abort command is necessary for the client write I/O request because the write was previously committed on all hosts 102. Thus, receiving only commit logs from currently active hosts 102 indicates that the failure occurred after commitment of the client write I/O requests on all hosts 102. In some cases, the 2PC coordinator 114 may further determine the failure occurred after commitment of the client write I/O request on all hosts 102 but before all commit logs were removed at each host 102. In particular, where 2PC coordinator 114 receives a number of commit logs corresponding to a same prepare ID (and LSN) that is less than a number of currently active hosts 102, 2PC coordinator may determine the failure occurred after commitment of the client write I/O request on all hosts 102 but before all commit logs were removed at each host 102. For example, assuming Prepare ID1 (corresponding to LSN1) is a prepare ID that was in the process of being committed when the failure occurred, where 2PC coordinator 114 receives only commit logs with Prepare ID1 and LSN1, but the number of commit logs received is less than a number of currently active hosts 102, 2PC coordinator may conclude the failure occurred after commitment of the client write I/O request but before all commit logs were removed at each host 102.

In yet another failure recovery scenario, where 2PC coordinator 114 receives both prepare logs and commit logs, for a same Prepare ID, from currently active hosts 102 (e.g., does not receive only prepare logs from currently active hosts 102 at operation 306 and does not receive only commit logs from currently active hosts 102 at operation 320), then 2PC coordinator 114 may determine that the failure occurred after a commit message was transmitted by 2PC coordinator 114 but before all hosts 102 (e.g., for which the commit message was transmitted to) were able to successfully commit a client write I/O request corresponding to the Prepare ID found on both the received prepare and commit logs. Accordingly, at operation 324, 2PC coordinator 114 may determine the prior assigned LSN for the client write I/O using one or more of the received commit logs (e.g., commit logs include both the Prepare ID and the assigned LSN). At operation 326, 2PC coordinator 114 may transmit a re-commit command for this client write I/O request corresponding to the previously assigned LSN. The command may instruct all currently active hosts 102 to re-commit using the previously assigned LSN.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can be a non-transitory computer readable medium. The computer readable medium can also be distributed over a network coupled computer system so that the computer readable code is stored and executed in a distributed fashion. In particular, one or more embodiments may be implemented as a non-transitory computer readable medium comprising instructions that, when executed by one or more processors of a computing system, cause the computing system to perform a method, as described herein.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for ensuring atomicity of transactions across a plurality of active hosts in a distributed environment, the method comprising:
   receiving, from a client, a second request to commit a second transaction subsequent to receiving a first request to commit a first transaction, wherein the first request and the second request are received by a coordinator host of the plurality of active hosts in the distributed environment;
   assigning a second prepare identifier (ID) to the received second transaction, wherein the second prepare ID assigned to the received second transaction is greater than a first prepare ID assigned to the received first transaction;
   transmitting, to the plurality of active hosts, instructions to prepare for committing the second transaction, the instructions including the second prepare ID;
   receiving, from each host of the plurality of active hosts, an acknowledgement indicating successful preparation for committing the second transaction; and
   transmitting, to the plurality of active hosts, instructions to commit the second transaction when the coordinator host has not received, from each host of the plurality of active hosts, an acknowledgement indicating the successful preparation for committing the first transaction.

2. The method of claim 1, wherein the instructions to prepare for committing the second transaction trigger each host of the plurality of active hosts to:
   persist payload data associated with the second transaction to storage; and
   generate a prepare log for the second transaction by adding metadata associated with the second transaction to a log maintained in the storage, wherein the metadata includes at least the second prepare ID assigned to the second transaction, and wherein persisting the payload data and generating the prepare log for the second prepare ID is independent of persisting of payload data and generating a prepare log for the first transaction assigned the first prepare ID.

3. The method of claim 1, further comprising:
   adding the second transaction to a commit batch containing one or more other transactions for which the coordinator host received one or more corresponding acknowledgements indicating successful preparation for committing the corresponding transaction;
   assigning a second log sequence number (LSN) to the commit batch, wherein the second LSN assigned to the commit batch containing the second transaction is greater than a first LSN assigned to a prior commit batch, and wherein the instructions to commit the second transaction include the second LSN;
   receiving, from each host of the plurality of active hosts, an acknowledgement indicating successful committing of the second transaction; and
   marking the second transaction as globally committed.

4. The method of claim 3, further comprising:
   receiving, from each host of the plurality of active hosts, an acknowledgement indicating successful preparation for committing the first transaction subsequent to transmitting, to the plurality of active hosts, the instructions to commit the second transaction;
   adding the first transaction to another commit batch; and
   assigning a third LSN to the other commit batch, wherein the third LSN assigned to the other commit batch containing the first transaction is greater than the second LSN assigned to the commit batch containing the second transaction.

5. The method of claim 3, wherein the instructions to commit the second transaction trigger each host of the plurality of active hosts to:
   commit payload data associated with the second transaction to storage; and
   generate a commit log for the second transaction by adding the second LSN assigned to the commit batch to a prepare log maintained in storage at each host of the plurality of active hosts and associated with the second transaction, wherein the prepare log contains at least the second prepare ID associated with the second transaction, and wherein committing the payload data and generating the commit log for the second LSN is subsequent to completion of committing of payload data and generating a commit log for the prior commit batch assigned the first LSN.

6. The method of claim 5, wherein the commit log for the second transaction is maintained in storage at each host of the plurality of active hosts until the coordinator host marks the second transaction as globally committed.

7. The method of claim 1, further comprising:
   detecting a failure in the distributed environment prior to transmitting the instructions to commit the second transaction;

requesting prepare logs and commit logs from the plurality of active hosts;
receiving a number of prepare logs containing at least the second prepare ID associated with the second transaction that is less than a number of currently active hosts; and
transmitting, to the currently active hosts, instructions to abort the second transaction based, at least in part, on the number of prepare logs containing at least the second prepare ID received being less than the number of the currently active hosts, the instructions including the second prepare ID.

8. The method of claim 1, further comprising:
detecting a failure in the distributed environment subsequent to transmitting the instructions to commit the second transaction;
requesting prepare logs and commit logs from the plurality of active hosts;
receiving a number of prepare logs containing at least the second prepare ID associated with the second transaction that is equal to a number of currently active hosts; and
performing recommitment of the second transaction based, at least in part, on the number of prepare logs containing at least the second prepare ID received being equal to the number of currently active hosts, wherein re-committing the second transaction comprises:
adding the second transaction to another commit batch;
assigning a new LSN to the other commit batch; and
transmitting, to the plurality of active hosts, instructions to re-commit the second transaction, the instructions including the new LSN.

9. The method of claim 1, further comprising:
detecting a failure in the distributed environment subsequent to transmitting the instructions to commit the second transaction;
requesting prepare logs and commit logs from the plurality of active hosts;
receiving both prepare logs containing at least the second prepare ID associated with the second transaction and commit logs containing at least the second prepare ID associated with the second transaction; and
transmitting, to the plurality of active hosts, instructions to re-commit the second transaction based, at least in part, on receiving both the prepare logs and the commit logs containing at least the second prepare ID, the instructions including the second LSN.

10. The method of claim 1, further comprising:
detecting a failure in the distributed environment subsequent to transmitting the instructions to commit the second transaction;
requesting prepare logs and commit logs from the plurality of active hosts;
receiving only commit logs containing at least the second prepare ID associated with the second transaction, where a number of the commit logs is less than a number of the plurality of active hosts; and
determining to ignore the second transaction based, at least in part, on receiving only commit logs containing at least the second prepare ID and the number of the commit logs received being less than the number of the plurality of active hosts.

11. A system comprising one or more processors and a non-transitory computer readable medium comprising instructions that, when executed by the one or more processors, cause the system to perform a method of ensuring atomicity of transactions across a plurality of active hosts in a distributed environment, the method comprising:
receiving, from a client, a second request to commit a second transaction subsequent to receiving a first request to commit a first transaction, wherein the first request and the second request are received by a coordinator host of the plurality of active hosts in the distributed environment;
assigning a second prepare identifier (ID) to the received second transaction, wherein the second prepare ID assigned to the received second transaction is greater than a first prepare ID assigned to the received first transaction;
transmitting, to the plurality of active hosts, instructions to prepare for committing the second transaction, the instructions including the second prepare ID;
receiving, from each host of the plurality of active hosts, an acknowledgement indicating successful preparation for committing the second transaction; and
transmitting, to the plurality of active hosts, instructions to commit the second transaction when the coordinator host has not received, from each host of the plurality of active hosts, an acknowledgement indicating the successful preparation for committing the first transaction.

12. The system of claim 11, wherein the instructions to prepare for committing the second transaction trigger each host of the plurality of active hosts to:
persist payload data associated with the second transaction to storage; and
generate a prepare log for the second transaction by adding metadata associated with the second transaction to a log maintained in the storage, wherein the metadata includes at least the second prepare ID assigned to the second transaction, and wherein persisting the payload data and generating the prepare log for the second prepare ID is independent of persisting of payload data and generating a prepare log for the first transaction assigned the first prepare ID.

13. The system of claim 11, wherein the method further comprises:
adding the second transaction to a commit batch containing one or more other transactions for which the coordinator host received one or more corresponding acknowledgements indicating successful preparation for committing the corresponding transaction;
assigning a second log sequence number (LSN) to the commit batch, wherein the second LSN assigned to the commit batch containing the second transaction is greater than a first LSN assigned to a prior commit batch, and wherein the instructions to commit the second transaction include the second LSN;
receiving, from each host of the plurality of active hosts, an acknowledgement indicating successful committing of the second transaction; and
marking the second transaction as globally committed.

14. The system of claim 13, wherein the method further comprises:
receiving, from each host of the plurality of active hosts, an acknowledgement indicating successful preparation for committing the first transaction subsequent to transmitting, to the plurality of active hosts, the instructions to commit the second transaction;
adding the first transaction to another commit batch; and
assigning a third LSN to the other commit batch, wherein the third LSN assigned to the other commit batch containing the first transaction is greater than the second LSN assigned to the commit batch containing the second transaction.

15. The system of claim 13, wherein the instructions to commit the second transaction trigger each host of the plurality of active hosts to:
commit payload data associated with the second transaction to storage; and
generate a commit log for the second transaction by adding the second LSN assigned to the commit batch to a prepare log maintained in storage at each host of the plurality of active hosts and associated with the second transaction, wherein the prepare log contains at least the second prepare ID associated with the second transaction, and wherein committing the payload data and generating the commit log for the second LSN is subsequent to completion of committing of payload data and generating a commit log for the prior commit batch assigned the first LSN.

16. The system of claim 15, wherein the commit log for the second transaction is maintained in storage at each host of the plurality of active hosts until the coordinator host marks the second transaction as globally committed.

17. The system of claim 11, wherein the method further comprises:
detecting a failure in the distributed environment prior to transmitting the instructions to commit the second transaction;
requesting prepare logs and commit logs from the plurality of active hosts;
receiving a number of prepare logs containing at least the second prepare ID associated with the second transaction that is less than a number of currently active hosts; and
transmitting, to the currently active hosts, instructions to abort the second transaction based, at least in part, on the number of prepare logs containing at least the second prepare ID received being less than the number of the currently active hosts, the instructions including the second prepare ID.

18. The system of claim 11, wherein the method further comprises:
detecting a failure in the distributed environment subsequent to transmitting the instructions to commit the second transaction;
requesting prepare logs and commit logs from the plurality of active hosts;
receiving a number of prepare logs containing at least the second prepare ID associated with the second transaction that is equal to a number of currently active hosts; and
performing recommitment of the second transaction based, at least in part, on the number of prepare logs containing at least the second prepare ID received being equal to the number of currently active hosts, wherein re-committing the second transaction comprises:
adding the second transaction to another commit batch;
assigning a new LSN to the other commit batch; and
transmitting, to the plurality of active hosts, instructions to re-commit the second transaction, the instructions including the new LSN.

19. The system of claim 11, wherein the method further comprises:
detecting a failure in the distributed environment subsequent to transmitting the instructions to commit the second transaction;
requesting prepare logs and commit logs from the plurality of active hosts;
receiving both prepare logs containing at least the second prepare ID associated with the second transaction and commit logs containing at least the second prepare ID associated with the second transaction; and
transmitting, to the plurality of active hosts, instructions to re-commit the second transaction based, at least in part, on receiving both the prepare logs and the commit logs containing at least the second prepare ID, the instructions including the second LSN.

20. A non-transitory computer-readable medium comprising instructions that, when executed by one or more processors of a computing system, cause the computing system to perform a method of ensuring atomicity of transactions across a plurality of active hosts in a distributed environment, the method comprising:
receiving, from a client, a second request to commit a second transaction subsequent to receiving a first request to commit a first transaction, wherein the first request and the second request are received by a coordinator host of the plurality of active hosts in the distributed environment;
assigning a second prepare identifier (ID) to the received second transaction, wherein the second prepare ID assigned to the received second transaction is greater than a first prepare ID assigned to the received first transaction;
transmitting, to the plurality of active hosts, instructions to prepare for committing the second transaction, the instructions including the second prepare ID;
receiving, from each host of the plurality of active hosts, an acknowledgement indicating successful preparation for committing the second transaction; and
transmitting, to the plurality of active hosts, instructions to commit the second transaction when the coordinator host has not received, from each host of the plurality of active hosts, an acknowledgement indicating the successful preparation for committing the first transaction.

* * * * *